United States Patent [19]

Sorenson

[11] 4,124,927
[45] Nov. 14, 1978

[54] AUTOMATIC LATHE WITH ROTARY CUTTER

[76] Inventor: Jess F. Sorenson, 12393 Overcrest Dr., Yucaipa, Calif. 92399

[21] Appl. No.: 736,972

[22] Filed: Oct. 29, 1976

Related U.S. Application Data

[63] Continuation of Ser. No. 457,918, Apr. 4, 1974, abandoned, which is a continuation-in-part of Ser. No. 237,487, Mar. 23, 1972, Pat. No. 3,827,318.

[51] Int. Cl.$^2$ .................. B23P 23/02; B23Q 39/02; B23B 5/44
[52] U.S. Cl. .................................... 29/37 A; 29/57; 82/18
[58] Field of Search .................. 82/1 C, 19; 29/37 A, 29/57; 408/48

[56] References Cited

U.S. PATENT DOCUMENTS 2,496,995  2/1950  Gorton ........................... 29/37 A X 3,442,175  5/1969  Heap et al. ........................ 408/48 X

FOREIGN PATENT DOCUMENTS 249,643    8/1928  Italy ............................................ 82/19
1,200,142  7/1970  United Kingdom ........................ 82/18

*Primary Examiner*—Leonidas Vlachos
*Attorney, Agent, or Firm*—Knobbe, Martens, Olson, Hubbard & Bear

[57] ABSTRACT

A sliding headstock automatic lathe includes a cutting tool which rotates in the same direction as the workpiece and at a speed precisely twice that of the workpiece, resulting in two or more flat cuts on the workpiece. The cutting tool is rotated by a connecting shaft driven by the same drive means which also rotates the workpiece. The connecting shaft is telescoping to accommodate the relative longitudinal movement of the lathe spindle nose and is pivotally attached between the drive means and the cutting tool to allow lateral movement of the cutting tool without slippage.

15 Claims, 5 Drawing Figures

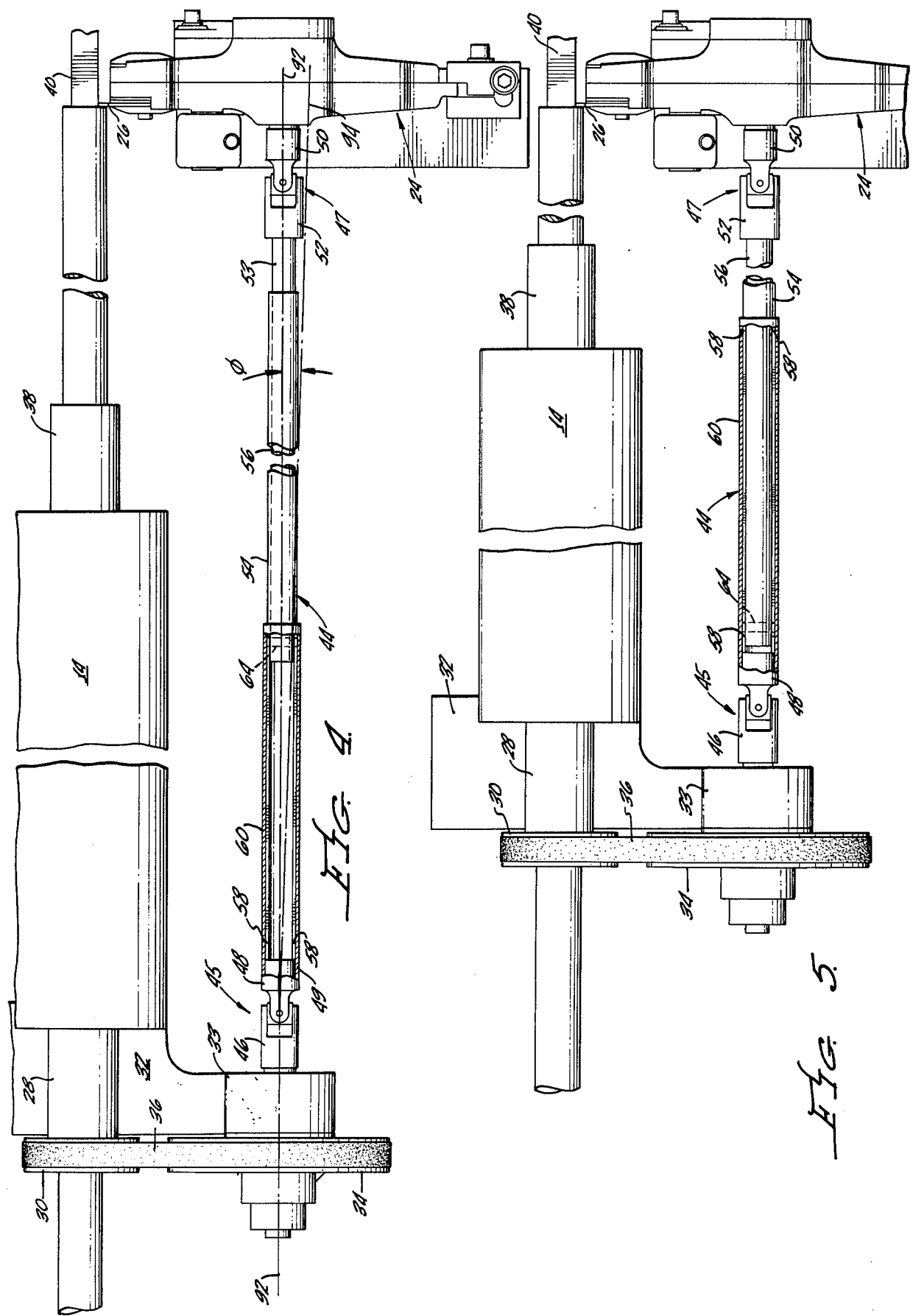

AUTOMATIC LATHE WITH ROTARY CUTTER

RELATED APPLICATION

This application is a continuation of application Ser. No. 457,918 filed on Apr. 4, 1974, now abandoned, which was a continuation-in-part of application Ser. No. 237,487 filed Mar. 23, 1972, now U.S. Pat. No. 3,827,318.

BACKGROUND OF THE INVENTION

This invention relates to sliding headstock automatic lathes, and more particularly to a rotary cutter accessory for such lathes.

Sliding headstock automatic lathes conventionally include a collet chuck which grips a workpiece and reciprocates to advance the workpiece past a plurality of tools. The tools are selectively moved laterally into contact with the workpiece to perform machinery operations such as turning. In the past, turning tools conventionally have had edges which remain stationary, i.e. do not rotate, during the turning operation. Such tools in combination with a rotating workpiece turn parts of circular cross-section, but cannot turn parts of square, or other polygonal cross-sections. Normally rods of polygonal cross-section are available only in certain standard sizes above one-eighth inch, except on special order.

It is known in the patented prior art that a lathe equipped with a cutting tool rotating at twice the speed, and in the same direction, as the workpiece can turn a part of square cross-section. Apparently the prior art technique has not been accepted commercially because the prior art devices presented problems for use on Swiss or sliding headstock lathes. It is generally not practical to turn large quantities of long, very slender small parts with non-sliding headstock machines.

One reason for the difficulty in adapting the rotary cutter to a sliding headstock machine arises from the fact that the headstock and the collet, which grips and rotates the workpiece, move longitudinally with respect to the tool, and the tool moves laterally with respect to the collet. Additionally, the collet and rotating tool must be driven from a common drive which positively avoids relative slippage, in order to assure that the ratio of speeds of rotation of the workpiece and the tool is precisely an integer or whole number, such as 2.0. If the ratio of speeds is, for example, 1.99 because of relative slippage, the cutting tool will strike the part at a slightly different point on each revolution and the desired flat surface is not achieved. One approach to solve the problem is found in my above referenced related application where the power to drive the cutting tool is taken directly off the collet by a pulley and belt arrangement in conjunction with a series of gears.

SUMMARY OF THE INVENTION

The present invention utilizes a connecting rod or shaft which is essentially parallel to the collet axis of the headstock and drives the cutting tool. Extending forward from the headstock is the collet chuck which grips and rotates the workpiece as it is advanced toward the cutting tool. This collet chuck is directly connected to a central shaft in the headstock which provides the rotative motion for the collet. Adjacent the rear of the headstock is a pulley connected to this central shaft which extends beyond the rear of the headstock. This pulley located on the central shaft is attached to a second pulley on the connecting rod by timing belt means to provide rotative power to the connecting rod. Because the connecting rod is of a telescoping arrangement it will be able to accommodate the advancing and retracting movement of the sliding headstock.

By driving the cutting tool off the same power shaft as that utilized to rotate the workpiece, it is possible to obtain precise ratios of speed between the cutting tool and the workpiece through the elimination of possible relative slippage. Also, because of the telescoping action of the connecting rod and the unique connection for attachment of the respective ends of the connecting rod to the driving pulley and the cutting tool, the longitudinal movement of the headstock and the lateral movement of the cutting tool are possible.

The utilization of the drive takeoff from the central shaft of the headstock to drive the connecting rod located to the rear of the headstock also eliminates any possible congestion which may result if the drive takeoff were located toward the forward end of the headstock near the contact point between the workpiece and the cutting tool. In addition, the location of the drive means for the connecting rod to the rear of the headstock allows the use of a longer connecting rod between the drive means and the cutting tool which results in a small and nearly insignificant misalignment angle between the connecting rod and the main spindle. The connecting rod is oriented to be aligned with the axis of the main spindle when the cutting tool is in the middle of its working range in order to minimize any misalignment angle in the course of the cutting operation.

The orientation of the cutting tool in the present invention is such that the rotation is always downward in order to direct the resultant cutting chips downward which provides an added safety feature and promotes a cleaner area around the tool and the entire machine because the chips are directed downward toward the chip container, whereas if the chips are directed upward they create a clogging of the tool slides and impair visibility.

A large diameter output bearing is mounted on the cutting tool shaft on a sleeve to minimize and help avoid excessive wear on the cutting tool gear caused by the cutting tool making square cuts on the workpiece resulting in a hammering effect as the cutting edges alternately contact the workpiece. Also, the large size of the output bearing allows for easier removal of the cutting tool gear when necessary, because the removal of one end of the bearing sleeve exposes the entire cutting tool gear. Another significant advantage of the large bearing is to provide a slight amount of resistive force on the cutting tool gear in order to compensate for the inherent slippage or slack found in the drive train, e.g. in the meshing of the cutting tool gear with the propelling gears, resulting from the fact that teeth size and the interfacing teeth spacing are not precisely identical. Because it is quite critical that the rotation of the cutting tool be at a precise ratio of the rotation of the workpiece, slippage is not desirable since it would disrupt the rotational relation between the cutting tool and the workpiece by slowing the cutting tool as it takes up any slack between the gear teeth when it contacts the workpiece every half cycle. The large friction type bearing provides the correct amount of force or slight braking action on the cutting gear, adjacent meshing gears, and universal joints to always maintain the gears and universal joints in a slightly loaded condition. Therefore, as the cutting edges alternately contact the workpiece, the teeth of the gears will always be tight against each other in the direction of rotation for the cutting operation, so that no slippage or slack between the gears will be experienced when a cutting force is alternately placed on the gears. The large diameter of the bearing is important to the operation of preventing slack in the gears, because only a very small amount of resistive force can be tolerated between the cutting tool gear and the bearing, so that no significant amount of friction heat is built up. The large diameter of the bearing in conjunction with this very small resistance contact provide a large enough moment force to maintain the gears in a slightly loaded condition.

Another advantage of the drive takeoff pulley being connected to the central shaft at the rear of the headstock is because the thrust bearings are located at that point in that shaft and are strong enough to adequately withstand the side thrust of the drive belt utilized to propel the connecting shaft.

BRIEF DESCRIPTION OF THE DRAWINGS

FIG. 4 is a plan view showing the headstock and connecting shaft in the extended position; and FIG. 5 is a plan view showing the headstock and connecting shaft in the contracted position.

DETAILED DESCRIPTION OF THE INVENTION

Figure 1:
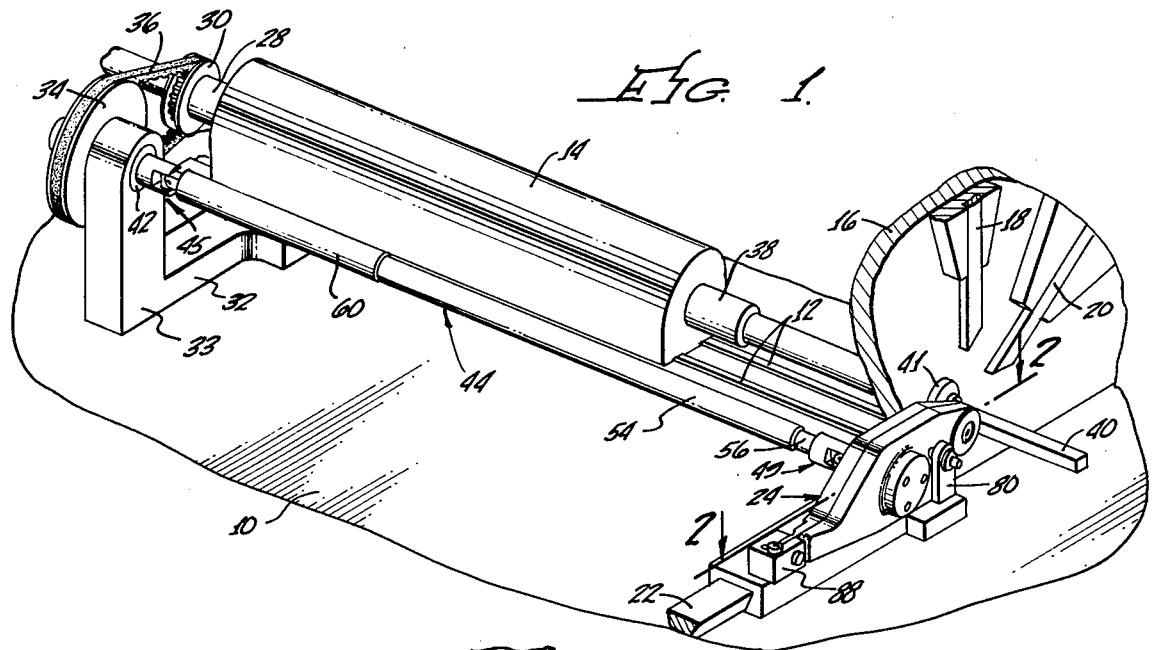
FIG. 1 is a perspective view showing an automatic lathe incorporating this invention.

The upper portion of an automatic lathe is shown in FIG. 1 having a base 10 which supports a pair of tracks 12 used to allow the sliding headstock 14 to reciprocate longitudinally along the base 10. Also mounted on the base 10 is a vertical support 16 which holds several tools 18 and 20. Slidably mounted on lateral track 22 is a holder means 24 supporting the rotative cutting tool 26 (shown on FIG. 2).

Extending from the rear of the sliding headstock 14 in FIG. 1 is the main spindle 28 which is driven in a rotative fashion by conventional means not shown. Attached around the main spindle 28 is a drive pulley 30. Mounted on the sliding headstock 14 is a support bracket 32 having an upright portion 33 which supports a receiving pulley 34. Connecting the drive pulley 30 and the takeoff pulley 34 is a drive belt 36 which is a toothed turning belt to maintain timing.

Located on the front portion of the headstock 14 is a collet 38 which receives the workpiece 40 that is introduced through the main spindle 28, the collet, and a bushing 41 located in the vertical support 16. The collet 38 is driven in rotative fashion by the main spindle 28. The collet also grips the workpiece in order to propel the workpiece 40 in the same rotative motion as it is fed through the support bushing 41 and adjacent the cutting tool 26.

The takeoff pulley 34 has a rotative neck bushing 42 which is pivotally attached to one end of a connecting rod 44. The other end of the connecting rod is attached to the holder means 24. The attachment of the connecting rod is shown in more detail in FIGS. 4 and 5 where the shoulder 42 has a universal joint 45 located on the rearward end 49 of the connecting rod 44 including a universal connection member 46 which is pivotally attached to a mating universal joint connection member 48. Similarly mounted on the holder means 24 is a universal joint 47 located on the forward end 53 of the connecting rod 44 including a universal connection member 50 which is pivotally attached to a mating universal joint connection member 52. The universal joints 45 and 47 allow lateral movement of the holding means 24 while being rotated as will be explained below.

The telescoping connecting rod 44 is comprised of an outer tube 54 and an interior tube 56 which slidably telescopes within the outer tube 54. To avoid any possible slippage or mushiness in the telescoping operation of the connecting rod 44 the telescoping fit of the interior tube 56 within the outer tube 54 is quite close with little tolerance. Formed in the outer tube 54 are two identical longitudinal slots 58 located 180° from each other. A retaining peg 64 is anchored within the interior tube 56 and extends above the surface of the interior tube 56 at two places 180° from each other in order to fit within the two slots 58. The distance the peg 64 extends above the surface of interior tube 56 is approximately the thickness of the outer tube 54. The peg 64 fits tightly within the narrow width of the slots 58 in order to prevent any looseness or slip in the connection. The combination of the peg 64 and the slots 58 prevents any relative slippage between the outer tube 54 and the interior tube 56. This is very important when considering the precise integer of ratio in the turning of the workpiece and the cutting tool. Covering the rearward end 49 of the connecting rod 44 is a cover tube 60. The slots 58 are at least as long as the throw of the headstock identified by the distance between the advanced and retracted positions.

Figure 2:
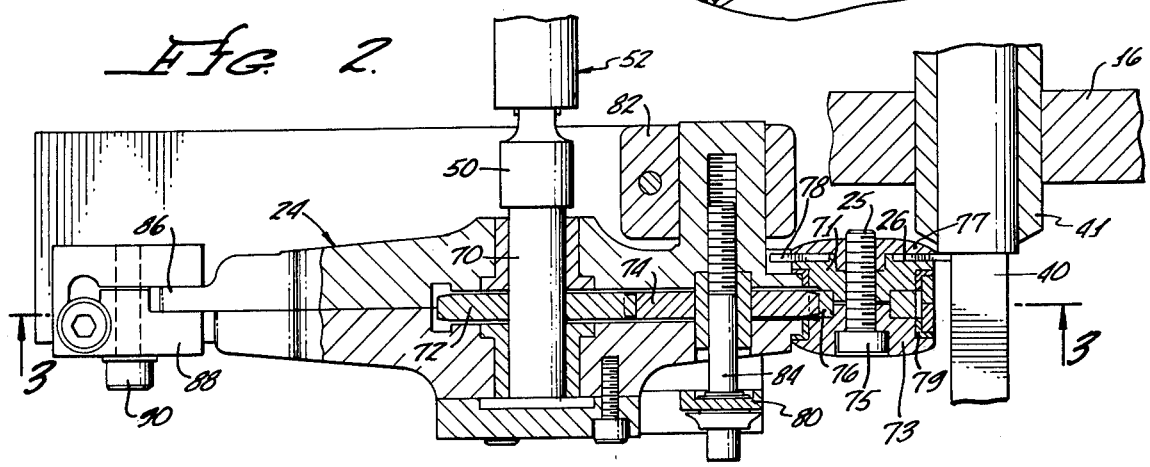
FIG. 2 is a sectional plan view taken along the lines 2—2 in FIG. 1.
Figure 3:
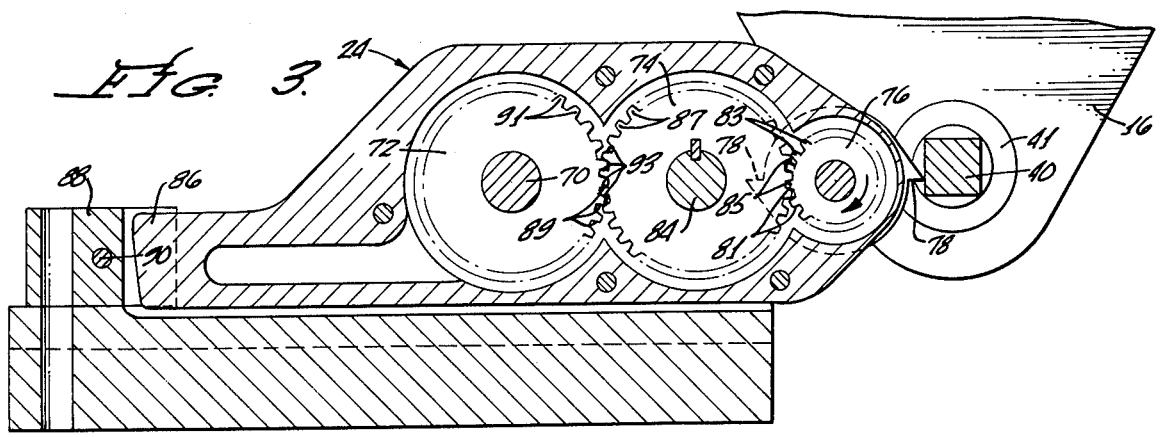
FIG. 3 is a sectional view taken along the lines 3—3 in FIG. 2.

Referring now to FIG. 2, the universal joint connection 50 is attached to a shaft 70 which supports a gear 72. The rotative force from the connecting rod 44 drives the shaft 70 and gear 72 which in turn propels an adjacent idler gear 74. Meshing with the idler gear 74 is the tool gear 76 which rotates the cutting tool 26 about the axis 25. Shown more clearly in FIG. 3 the cutting tool 26 is comprised of two cutting surfaces 78 which are oriented 180° from each other.

More particularly the tool gear 76 is encased by a gear sleeve 71 on one side facing the cutting tool 26 and a locking cap 73 on the other side. The cutting gear shaft 25 is threaded into the gear sleeve 71 and the locking cap 73. One end of the cutting gear shaft 25 has a release head 75 to facilitate the removal or insertion of the cutting tool shaft 25 with respect to the gear sleeve 71 and locking cap 73. The cutting tool 26 is securely held on the cutting shaft 25 and adjacent gear sleeve by an arbor 77 which is threadly received on the cutting gear shaft 25. The gear sleeve 71, locking cap 73 and the shaft 25 operate within an output bearing 79 which cylindrically mounted on the gear sleeve and locking cap and is as large in diameter as possible without interfering with the workpiece 40 in order to provide the maximum bearing support for the operation of the cutting tool 26. Consequently, the sleeve 71 and locking cap 73 also are made relatively large to complement the necessary larger diameter of the output bearing 79. It will be noted that the bearing diameter is larger than the outside diameter of the cutting tool gear 76. This is to allow easy removal of the gear 76 when the release head 75 of the shaft 25 is turned to remove the shaft and the locking cap 73. Also when the shaft is removed, the arbor 77 can be removed to replace the cutting tool 26.

The output bearing 79 is contained by the holding means 24.

Because the output bearing 79 has a diameter which is as close as possible to the size of the diameter of the cutting tool 26 without interfering with the workpiece, the output bearing 79 will provide maximum bearing support to the operation of the cutting tool 26 and the associated cutting gear 76. This large bearing diameter size is quite important in the cutting tool operation when making square cuts, since the cutting tool and gear will be experiencing a cycling impact or hammering effect caused by the repeated contact of the cutting edges 78 with the workpiece 40. The large diameter bearing 79 helps to alleviate the significant wear on the gear 76 which this hammering effect may cause.

Furthermore, the bearing 79 provides a slight force or braking action on the gear 76, so that the trailing side 81 of the teeth 83 in the cutting tool gear 76 are in tight contact with the leading side 85 of the idler gear teeth 87 at all times during the cutting operation regardless of whether the cutting edges 78 are in contact with the workpiece 40 or not. The leading side 89 of the teeth 91 of the driving gear 72 are also in tight contact with the trailing side 93 of the idler gear teeth 87. If this slight braking action of the bearing 79 were not present, the rotational speed of the cutting tool 26 would vary every time the leading side 85 of the idler gear teeth 87 would hit against the trailing side 81 of the cutting tool gear teeth 83 when taking up the inherent gear slack each time one of the cutting edges 78 contacts the workpiece 40 placing a load on the cutting tool gear 76. Therefore, the large bearing 79 will insure the proper rotational relation between the rotation of the cutting tool 26 and the workpiece 40.

The holding means 24 has two mounting posts 80 and 82 which support a pivot shaft 84 used to allow vertical pivoting up and down of the cutter 26. The outside end 86 of the holding means 24 slidably fits within a locking flange 88 which is operated by a lock bolt 90 to secure the holding means with the cutter 26 in the desired vertical position.

Turning to the operation of the automatic lathe, a workpiece 40 is fed into the hollow main spindle 28 to the collet 38 which grips the workpiece and rotates it in accordance with the motion of the main spindle 28. The workpiece is fed forward through the support bushing 41 in the vertical support 16 to place it adjacent the cutting tool 26. As the main spindle 28 of the headstock 14 is rotated, the drive pulley 30 is also rotated and transfers this rotative force through the drive belt 36 to the takeoff pulley 34. The rotation of the takeoff pulley 34 is transferred through the rotative shoulder 42 and the connecting rod 44 to the holding means 24. The connecting rod rotates the gear 72 which in turn causes a rotation motion in the gears 74 and 76. This arrangement of gears allows the cutting tool 26 to rotate in the same direction as the workpiece 40 since both the workpiece 40 and the cutting tool 26 are operated off the same drive means or main spindle 28.

As noted above, the headstock 14 is mounted for reciprocation on the tracks 12. A power drive cam (not shown) controls reciprocation of the headstock 14. The headstock 14 is advanced toward the cutting tool as it grips the workpiece 40 to move the workpiece along past the cutting tool 26 as the cutting operation is completed. The workpiece is gripped in the collet during the advance of the headstock, so that the workpiece is advanced past the tools in addition to being rotated.

The workpiece 40 is released by the collet 38 in a conventional manner as the headstock 14 retracts, and the workpiece 40 is held against the retraction with the headstock by conventional means. As shown in FIGS. 4 and 5, the advanced and retracted positions of the headstock 14 also causes the drive pulley and takeoff pulley combination to reciprocate. Therefore, the connecting rod 44 has a telescoping construction utilizing the outer tube 54 telescoping over an inner tube 56. The retaining peg 64 is utilized to insure that there is no rotational slippage between the tubes 54 and 56.

Since the cutting tool 26 must be capable of advance and retraction as it is cutting into the workpiece, the holding means 24 has the ability to advance and retract from the workpiece along the track 22 by conventional means not shown. In order for the rotating connecting rod 44 to accommodate this lateral movement of the holding means 24, the universal joints 45 and 47 provide connections to allow this lateral movement in addition to the rotative motion of the connecting rod 44.

It is desirable, however, that the connecting rod 44 be as close to parallel as possible with the main spindle 28 during cutting to avoid the oscillating velocity which otherwise results from universal joints. Accordingly, the connecting rod 44 is oriented in cooperation with the holding means 24, so that the connecting rod 44 axis line 92 is essentially parallel with the main spindle 28 line 92 when the cutting tool 26 is in its average cutting depth position on the workpiece 40. Since the workpieces are quite small, the cutting depth will be very small, resulting in very little lateral displacement of the connecting rod 44 with respect to the axis line 92 during the cutting operation. The inherent slight lateral angular movement of the connecting rod 44 while operating in the cutting position is further minimized by having the takeoff pulley 34 mounted adjacent the rear portion of the headstock to provide a relatively long connecting rod thereby reducing the angular misalignment of the rod 44.

When the cutting tool 26 has completed its cutting operation on the workpiece 40, the holding means 24 moves the cutting tool 26 out of engagement with the workpiece. This movement of the holding means 24 causes the holding means end of the connecting rod adjacent the universal joint 47 to move laterally away from the main spindle 28 to a point represented by line 94, forming a misalignment angle $\phi$ with respect to the operating position of line 92. The nonparallelism is not harmful in noncutting position.

Since the same main spindle 28 drives both the workpiece 40 and the cutting tool 26 slippage is avoided and there is always a precise integer of rotative relation between the workpiece and the cutting tool. Usually this integer is a 2:1 ratio, but other integers are possible.

As explained more fully in my prior application referred to above, various polygonal shapes can be achieved by using different numbers of cutters at various placements around the periphery.

What is claimed is:

1. A lathe comprising:
   a base;
   sliding headstock means mounted on said base for reciprocating movement longitudinally of the base;
   collet means on said headstock for gripping a workpiece;
   first drive means reciprocating with said headstock for rotating said collet and workpiece in a first direction;

a vertical support mounted on said base forward of the sliding headstock;

a bushing in said vertical support in axial alignment with said collet for supporting the rotating workpiece forward of the collet;

feed means for reciprocating said headstock to advance said rotating workpiece through said bushing;

a plurality of tools mounted adjacent the forward face of said vertical support above the workpiece, each said tool being selectively engageable with the rotating workpiece;

a rotatable cutting tool mounted adjacent said bushing adjacent the forward face of said vertical support by mounting means permitting selective reciprocation of said rotatable tool toward and away from said workpiece, said rotating tool being located on the side of the workpiece which is moving upward as the workpiece rotates;

a first gear coaxial with said rotatable cutting tool and fixed thereto for rotation therewith, said first gear being slightly smaller in diameter than the cutting tool;

second and third gears disposed outwardly from said first gear and forming a drive train for driving said first gear;

second drive means disposed outwardly from said first drive means;

means operatively connecting said first and second drive means for reciprocation together and rotation together in the same direction; and an extensible shaft connecting said second drive means to said third gear for rotating said rotatable tool in said first direction at precisely an integer ratio relative to the rate of rotation of said workpiece and for permitting reciprocation of said second drive means axially relative to said third gear.

2. A lathe in accordance with claim 1 wherein said means operably connecting said first and second drive means comprises:

a support bracket mounted for reciprocating longitudinal movement with said headstock;

a drive pulley connected on said first drive means adjacent said support bracket;

a takeoff pulley mounted on said support bracket and connected to one end of said shaft; and a drive belt connected between said drive pulley and said takeoff pulley.

3. A lathe in accordance with claim 2 wherein said first drive means comprises a main spindle for driving said collet.

4. A lathe in accordance with claim 2 wherein said connection of said drive pulley to said first driving means and said connection of said takeoff pulley to said shaft are located to the rear of said headstock means to accommodate the long length of said shaft to reduce any possible angle of misalignment in said shaft between said takeoff pulley and said cutting tool.

5. A lathe in accordance with claim 1 wherein the attachment of said shaft to said second drive means comprises a universal joint.

6. A lathe in accordance with claim 1 wherein said extensible shaft comprises:

an inner telescoping tube; and an outer telescoping tube slidably engaged over said inner tube to allow said collet means and said means for rotating said tool to longitudinally reciprocate toward said cutting tool.

7. A lathe in accordance with claim 6 wherein said inner tube has a retaining peg extending from its surface, said outer tube having a pair of longitudinal slots to accommodate said peg to prevent any relative rotative movement between said tubes.

8. A lathe in accordance with claim 1 wherein said rotating cutting tool and said first, second, and third gears are mounted in a holder means.

9. A lathe in accordance with claim 8 further comprising means for pivotally supporting said holder means for positioning said rotating cutting tool vertically with respect to said workpiece and for adjusting the height of said cutting tool to clear said plurality of tools.

10. A lathe in accordance with claim 8 and further comprising:

a rail fixed on said base and running perpendicular to the axis of said workpiece; and means mounting said holder on said rail for movement therealong to adjust the depth of cut of the rotating tool.

11. A lathe in accordance with claim 1 wherein said shaft is generally parallel to the axis of said workpiece when said rotating tool is in its normal range of cutting positions.

12. A lathe comprising:

a base;

headstock means mounted on said base for reciprocating movement longitudinally on the base;

collet means on said headstock for gripping a workpiece;

drive means reciprocating with said headstock for rotating said collet and workpiece;

a rotatable cutting tool mounted on said base;

feed means for reciprocating said headstock means to advance said workpiece adjacent said tool as said workpiece rotates;

a connecting rod having one end connected to said tool;

means attached between the other end of said connecting rod and said drive means for rotating said tool at precisely an integer ratio relative to the rate of rotation of said rod while accommodating reciprocation of said drive means relative to said cutting tool;

a pulley means attached to one end of said tool adjacent the said drive means and fixed against lateral movement relative to said headstock;

belt means operatively connecting said drive means and said pulley means;

holder means rotatably mounting said cutting tool, and mounted for lateral movement on said base perpendicular to the collet axis for advancing and retracting the cutting tool, said holder means attached to the other end of said connecting rod to rotate said cutting tool;

a cutting tool gear mounted in said holder means;

a cutting gear shaft rotatably responsive to said cutting tool gear;

a gear sleeve mounted on said cutting gear shaft, adjacent one side of said cutting tool gear;

a locking cap mounted on said cutting gear shaft adjacent the other side of said cutting tool gear; and an output bearing cylindrically mounted on said gear sleeve and said locking cap adjacent said cutting tool gear, said output bearing having a diameter greater than the outside diameter of said cutting tool gear.

13. A lathe comprising:

a base;

head stock means mounted on said base for reciprocating movement longitudinally on the base;

collet means on said headstock for gripping a workpiece;

drive means reciprocating with said headstock for rotating said collet and workpiece;

a rotatable cutting tool mounted on said base;

feed means for reciprocating said feedstock means to advance said workpiece adjacent said tool as said workpiece rotates;

a connecting rod having one end connected to said tool;

means attached between the other end of said connecting rod and said drive means for rotating said tool at precisely an integer ratio relative to the rate of rotation of said rod while accommodating reciprocation of said drive means relative to said cutting tool;

a pulley means attached to one end of said rod adjacent the said drive means and fixed against lateral movement relative to said headstock;

belt means operatively connecting said drive means and said pulley means;

holder means rotatably mounting said cutting tool, and mounted for lateral movement on said base perpendicular to the collet axis for advancing and retracting the cutting tool, said holder means attached to the other end of said connecting rod to rotate said cutting tool;

a cutting tool gear mounted in said holder means;

a cutting gear shaft rotatably responsive to said cutting tool gear;

a gear sleeve mounted on said cutting gear shaft, adjacent one side of said cutting tool gear;

a locking cap mounted on said cutting gear shaft adjacent the other side of said cutting tool gear; and an output bearing cylindrically mounted on said gear sleeve and said locking cap adjacent said cutting tool gear, said output bearing having a diameter greater than the outside diameter of said cutting tool gear, said locking cap has an outside diameter as great as the outside diameter of said cutting tool gear, said locking cap being removable from said other side of said cutting tool gear, exposing said cutting tool gear to facilitate removal of said cutting tool gear.

14. A lathe comprising:

means for gripping and rotating a workpiece;

a rotatable cutting tool mounted adjacent said workpiece and having a cutting edge;

means for rotating said cutting tool at precisely an integer ratio relative to the rate of rotation of said workpiece, said cutting edge of said cutting tool alternately rotating into and out of engagement with said workpiece;

said cutting tool including:

a cutting tool gear;

a cutting gear shaft rotatably responsive to said cutting tool gear;

a gear sleeve mounted on said cutting gear shaft, adjacent one side of said cutting tool gear;

a locking cap mounted on said cutting gear shaft adjacent the other side of said cutting tool gear; and an output bearing cylindrically mounted on said gear sleeve and said locking cap adjacent said cutting tool gear, said output bearing having a diameter greater than the outside diameter of said cutting tool gear.

15. A lathe in accordance with claim 14 wherein said locking cap has an outside diameter as great as the outside diameter of said cutting tool gear, said locking cap being removable from said other side of said cutting tool gear, exposing said cutting tool gear to facilitate removal of said cutting tool gear.

* * * * *